(12) United States Patent
Dahlberg et al.

(10) Patent No.: US 7,331,110 B2
(45) Date of Patent: Feb. 19, 2008

(54) DEVICE FOR A POLE SAW

(75) Inventors: Göran Dahlberg, Gränna (SE); Gustaf Döragrip, Jönköping (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 10/550,771

(22) PCT Filed: Mar. 26, 2004

(86) PCT No.: PCT/SE2004/000468

§ 371 (c)(1),
(2), (4) Date: Aug. 29, 2006

(87) PCT Pub. No.: WO2004/087385

PCT Pub. Date: Oct. 14, 2004

(65) Prior Publication Data

US 2007/0017105 A1    Jan. 25, 2007

(30) Foreign Application Priority Data

Apr. 4, 2003    (SE) .................................... 0300989

(51) Int. Cl.
*B26B 27/00*    (2006.01)
(52) U.S. Cl. ........................ 30/296.1; 30/123; 30/381
(58) Field of Classification Search ................ 30/123, 30/381–387, 296.1
See application file for complete search history.

(56) References Cited

U.S. PATENT DOCUMENTS

| | | | | |
|---|---|---|---|---|
| 2,703,928 A | * | 3/1955 | Southwick ................... | 30/386 |
| 3,343,613 A | * | 9/1967 | Carnesecca, Jr. et al. ... | 173/169 |
| 4,010,544 A | * | 3/1977 | Siman ......................... | 30/381 |
| 4,048,722 A | * | 9/1977 | Howard ....................... | 30/386 |
| 4,117,594 A | | 10/1978 | Arbuckle | |
| 4,574,481 A | * | 3/1986 | Ericsson .................... | 30/296.1 |
| 4,654,971 A | * | 4/1987 | Fettes et al. .................. | 30/383 |
| 5,013,282 A | * | 5/1991 | Keller ......................... | 464/172 |
| 5,718,050 A | | 2/1998 | Keller et al. | |
| 5,896,669 A | * | 4/1999 | Uhl ............................. | 30/383 |
| 6,112,419 A | * | 9/2000 | Uhl et al. ..................... | 30/383 |
| 6,182,367 B1 | | 2/2001 | Janczak | |
| 6,502,315 B2 | * | 1/2003 | Menzel et al. ............... | 30/381 |
| 2001/0008045 A1 | | 7/2001 | Menzel | |

* cited by examiner

*Primary Examiner*—Timothy V. Eley
(74) *Attorney, Agent, or Firm*—Pearne & Gordon LLP

(57) ABSTRACT

This invention relates to a device for a pole saw for pruning trees or bushes. The pole saw comprises an elongated stiff tube extending from a drive unit to a remote chain saw head (12) and incorporates a drive shaft (14) connected to an input shaft (15) of a gear (16) arranged in the chain saw head (12). The gear is provided with an output shaft (18) on which a sprocket wheel (20) for driving a saw chain is arranged. A mass body vibration damper (23) is arranged between the gear (16) and the sprocket wheel (20).

5 Claims, 2 Drawing Sheets

DEVICE FOR A POLE SAW

Device for a pole saw for pruning trees or bushes comprising an elongated stiff tube extending from a drive unit to a remote chain saw head and incorporating drive shaft connected to an input shaft of a gear arranged in the chain saw head the gear being provided with an output shaft on which a sprocket wheel for driving a saw chain is arranged.

Pole saws of the above type are previously known but rather often such saws start to vibrate heavily when being used. This is due to the fact that the teeth of the chain get stuck in the material being cut. The vibrations are initiated when sufficient amount of energy accumulates in the elastic transmission system and the teeth suddenly leave hold of the material after being stuck in the material. The vibration level can be influenced by many different factors such as the gear ratio between the drive engine and the chain drive, the torque and bending stiffness of the guide bar, the drive shaft, the oscillating mass of the engine and saw head, the position of the chain bar guide, the rotation direction of the engine and so on. Mostly these factors are difficult to change without creating other disadvantages.

It has been suggested to solve the problem mentioned above by mounting a vibration damper at the outside of the sprocket wheel. A disadvantage with such an arrangement is however that the width of the saw head increases compared to a conventional arrangement. Moreover, because the damper is rather heavy the weight distribution becomes worse in particular since the weight of the guide bar and the chain are positioned at the same side of the saw head. A further disadvantage is that the damper is an obstacle when replacing the chain or when removing the guide bar.

The purpose of this invention is to create a simple and cheap vibration damper which is a part of an improved integrated weight distribution system and which is not an obstruction when replacing the chain or guide bar. The device according to the invention also reduces the width of the saw head and serves as a protection for the gear housing if the chain should come off the sprocket wheel. This is achieved by means of a device having the characteristics mentioned in the claims.

BRIEF DESCRIPTION OF THE DRAWINGS

An embodiment of the invention will now be described with reference to the accompanying drawings on which:

FIG. 2 is a perspective view of a saw head (without the guide bar and chain) which is a part of the pole saw whereas.

Figure 1:
FIG. 1 shows a pole saw in operating position.
Figure 2:
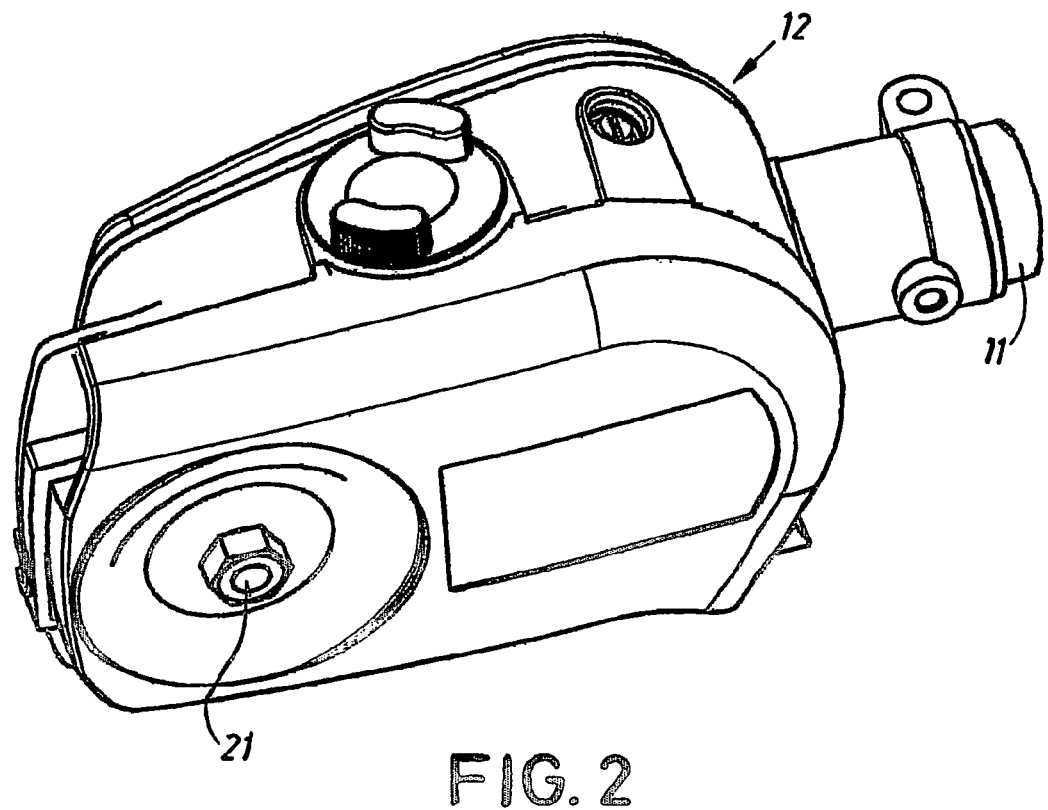
Figure 3:
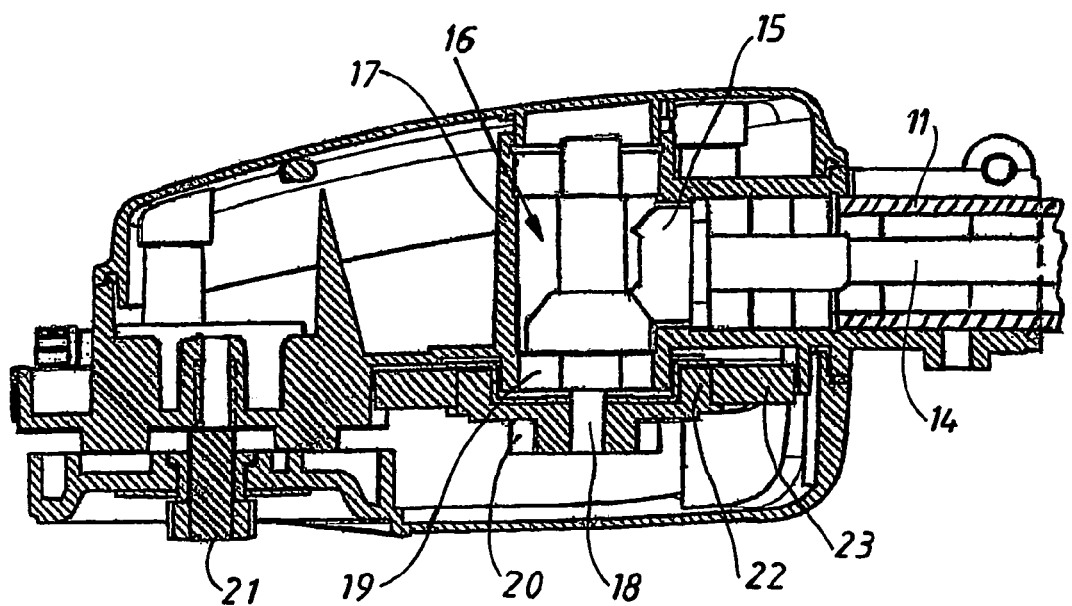
FIG. 3 is a horizontal section through the saw head in FIG. 2.

As appears from FIG. 1 the pole saw comprises a drive unit 10 such as an internal combustion engine or an electric motor that via an elongated stiff tube 11 is connected to a saw head 12 having a guide bar 13 on which an endless saw chain is arranged. The tube 11 encloses a drive shaft 14 that is driven by the drive unit 10 and is connected to an inlet shaft 15 of a gear transmission 16 that is enclosed in a gear housing 17. The gear housing is an integrated part of the saw head and is preferably made of light metal. An outlet shaft 18 of the gear transmission is supported by a bearing 19 and has an outer end on which a sprocket wheel 20 is secured. The guide bar 13 is in the usual way clamped to the saw head by means of a bar bolt 21 which can be loosened in order to make it possible to move the guide bar in its length direction in order to tighten the endless chain supported by the guide bar.

The sprocket wheel 20 has a hub part 22 on which a vibration damper 23 is secured and rotates together with the sprocket wheel. The vibration damper 23 is a circular, hollow, large mass body and is preferably made of steel or sintered material but might as well be an integrated part of the sprocket wheel 20 or be supported by it. The vibration damper is placed at the inner side of the sprocket wheel 20 i.e. on the side that faces the gear housing and serves together with the hub part 22 that surrounds the bearing 19 as an outer protection for the gear housing 17 if the chain should get out of engagement with the sprocket wheel. The position of the vibration damper on said side of the sprocket wheel also gives a far better weight distribution compared to an arrangement where the damper is placed on the other side of the sprocket wheel.

The invention claimed is:

1. Device for a pole saw for pruning trees or bushes comprising an elongated stiff tube (11) extending from a drive unit (10) to a remote chain saw head (12) and incorporating a drive shaft (14) connected to an input shaft (15) of a gear (16) arranged in the chain saw head (12) the gear being provided with an output shaft (18) on which a sprocket wheel (20) for driving a saw chain is arranged wherein the output shaft (18) is supported by a bearing (19) and the sprocket wheel (20) is provided with a hub part (22) surrounding the bearing (19); a mass body vibration damper (23) is secured to the hub part (22) and the vibration damper (23) is arranged between the gear (16) and the sprocket wheel (20) on an inner side of the sprocket wheel (20); and the vibration damper (23) is configured to rotate with the sprocket wheel (20) and provide additional weight for the saw head (12).

2. Device for a pole saw according to claim 1 characterized in that the gear (16) is enclosed in a gear housing (17) and that the damper (23) serves as an outer protection for the gear housing.

3. Device for a pole saw according to claim 2 characterized in that the gear housing (17) is an integrated part of the saw head (12).

4. Device for a pole saw according to claim 2 or 3 characterized in that the gear housing (17) is made of light metal.

5. Device for a pole saw according to claim 1 characterized in that the damper (23) is an integrated part of the sprocket wheel (20) or is supported by it.

* * * * *